(12) United States Patent
Kanwar et al.

(10) Patent No.: US 12,299,856 B1
(45) Date of Patent: May 13, 2025

(54) SYSTEMS AND METHODS FOR ARTIFACT DETECTION AND REMOVAL FROM IMAGE DATA

(71) Applicant: Insitro, Inc., South San Francisco, CA (US)

(72) Inventors: Varun Kanwar, San Francisco, CA (US); Christopher Probert, Mill Valley, CA (US); Benjamin Dulken, Menlo Park, CA (US); Adelaide Woicik, Bellevue, WA (US); Zachary R. McCaw, Chapel Hill, NC (US)

(73) Assignee: Insitro, Inc., South San Francisco, CA (US)

( * ) Notice: Subject to any disclaimer, the term of this patent is extended or adjusted under 35 U.S.C. 154(b) by 0 days.

(21) Appl. No.: 18/999,793

(22) Filed: Dec. 23, 2024

Related U.S. Application Data

(63) Continuation of application No. PCT/US2024/054929, filed on Nov. 7, 2024.

(Continued)

(51) Int. Cl.
*G06T 7/70* (2017.01)
*G06T 5/70* (2024.01)

(52) U.S. Cl.
CPC ...... *G06T 5/70* (2024.01); *G06T 2207/10056* (2013.01); *G06T 2207/20024* (2013.01); *G06T 2207/30024* (2013.01)

(58) Field of Classification Search
CPC ............. G06T 5/70; G06T 2207/10056; G06T 2207/20024; G06T 2207/30024;

(Continued)

(56) References Cited

U.S. PATENT DOCUMENTS

| 2012/0127297 A1* | 5/2012 | Baxi ................... G06V 20/695 382/173 |
| 2019/0325568 A1* | 10/2019 | Stellari ................ G06T 7/0002 |
| 2022/0318979 A1 | 10/2022 | Chen et al. |

FOREIGN PATENT DOCUMENTS

| DE | 102021125512 A  * | 4/2023 | ............... G06T 5/50 |
| KR | 20190002219 A  * | 1/2019 | ........... G06T 5/0002 |

(Continued)

OTHER PUBLICATIONS

Baxi et al. (Jan. 2022). "Digital pathology and artificial intelligence in translational medicine and clinical practice," Modern Pathology, 35(1):23-32.

(Continued)

*Primary Examiner* — Jose L Couso
(74) *Attorney, Agent, or Firm* — MORRISON & FOERSTER LLP

(57) ABSTRACT

A method for filtering out artifacts from a microscopic image of a tissue includes determining a plurality of frequency values corresponding to a plurality of pixels in the microscopic image of the tissue; grouping the plurality of pixels into a plurality of pixel clusters based on the plurality of frequency values corresponding to the plurality of pixels; identifying, from the plurality of pixel clusters, one or more pixel clusters corresponding to one or more artifacts in the microscopic image; and filtering the microscopic image by removing one or more regions in the microscopic image corresponding to the one or more pixel clusters corresponding to the one or more artifacts.

20 Claims, 7 Drawing Sheets

Related U.S. Application Data

(60) Provisional application No. 63/548,141, filed on Nov. 10, 2023.

(58) Field of Classification Search
CPC ..... G06T 5/50; G06T 7/62; G06T 7/11; G06T 7/0012; G06T 2207/20016; G06T 2207/30004; G06T 2207/30242; G06T 2210/41; G06T 3/4046; G06T 5/60; G06T 9/002; G06T 2207/20076; G06T 2207/20081; G06T 2207/20084; G06V 10/30; G06V 10/32; G06V 10/764; G06V 10/507; G06V 10/25; G06V 10/50; G06V 20/69; G06V 20/695; G06V 10/698; G06V 20/698; G06V 20/762; G06V 20/50; G06V 10/454; G06V 10/54; G06V 10/774; G06V 10/82; G06V 20/41; G06V 30/18057; G06V 30/19173; G06F 18/2148; G06F 18/24; G06F 18/214; G06F 18/22; G06F 18/241; G06F 18/2411; G06F 18/2415; A61B 90/20; A61B 90/361; G21K 7/00; G02B 21/00; G02B 21/0012; G02B 21/0008; G01N 21/8851; G01N 21/9501; G01N 21/6458; G01N 15/1433; G01N 15/1497; G01N 15/1472; G01N 15/1486; G01N 15/1493; G01N 2223/419; H01L 21/67288; H01L 22/12; G06N 3/02; G06N 3/08–088; G06N 3/0445; G06N 3/0454; G06N 3/4046; G06N 7/00; G06N 7/01; G06N 20/00; G06K 7/1482; Y10S 128/925

See application file for complete search history.

(56) References Cited

FOREIGN PATENT DOCUMENTS

| | | | | |
|---|---|---|---|---|
| KR | 20220122106 A | * | 9/2022 | ............. G06T 5/50 |
| WO | WO-2015181371 A1 | * | 12/2015 | ............. G06T 5/002 |

OTHER PUBLICATIONS

Berman et al., (Aug. 2023). "SliDL: A toolbox for processing whole-slide images in deep learning," Plos One, 18(8): e0289499, 25 pages.
Dawson, H., (Jul. 2022). "Digital pathology—rising to the challenge," Frontiers in Medicine, 9:888896, 9 pages.
Gonzalez et al., (Nov. 2017). "Digital Image Processing," Pearson Education, New York, 4th edition, 1,022 pages.
Hanna et al., (Feb. 2022). "Integrating digital pathology into clinical practice," Modern Pathology, 35(2):152-164, 17 pages.
Janowczyk et al., (Apr. 2019). "HistoQC: An Open-Source Quality Control Tool for Digital Pathology Slides," JCO Clinical Cancer Informatics, 7 pages.
Jiao et al., (Jun. 2020). "An unsupervised image segmentation method combining graph clustering and high-level feature representation," Neurocomputing, 409: 83-92.
Kanwar et al., (May 2024). "Multi-artifact detection and filtering in digital pathology using intrinsic image properties," International Symposium on Biomedical Imaging, 3 pages.
National Cancer Institute, "Genomic Data Commons Data Portal," Accessed: Nov. 1, 2023, available online at <https://portal.gdc.cancer.gov/>, 6 pages.
Niazi et al., (May 2019). "Digital pathology and artificial intelligence," Lancet Oncol., 20(5): e253-e261, 16 pages.
Ostu, (Jan. 1979). "A Threshold Selection Method from Gray-Level Histograms," 9 IEEE Transactions on Sys., Man, and Cybernetics, SMC-9(1): 62-66.
Patil et al., (Mar. 2024). "Efficient quality control of whole slide pathology images with human-in-the-loop training," J. Pathology Informatics, 14: 100306, 12 pages.
Senaras et al., (Oct. 2018). "DeepFocus: Detection of out-of-focus regions in whole slide digital images using deep learning," PLOS One, 13(10): e0205387. 13 pages.
Smit et al., (May 2021). "Quality control of whole-slide images through multi-class semantic segmentation of artifacts," Medical Imaging with Deep Learning, 3 pages.
Wang et al., (Dec. 2021). "Stress Testing Pathology Models with Generated Artifacts," J Pathol Inform., 12:54, 9 pages.
Weinstein et al., (Oct. 2013). "The cancer genome atlas pan-cancer analysis project," Nature Genetics, 45(10):1113-1120, 14 pages.
Ajemba et al., (Mar. 2011). "Integrated segmentation of cellular structures," Medical Imaging 2011: Image Processing, SPIE, 7962(1), 10 pages.
Bouyssoux et al., (Jan. 2021). "Extended Depth of Field Preserving Color Fidelity For Automated Digital Cytology," 2020 25th International Conference On Pattern Recognition (Icpr), IEEE, 4398-4404.
Hiary et al., (Jul. 2013). "Segmentation and localisation of whole slide images using unsupervised learning," IET Image Processing, IET, 7(5):464-471.
International Search Report and Written Opinion received for International Patent Application No. PCT/US2024/054929 mailed on Feb. 14, 2025, 17 pages.

\* cited by examiner

100

```
determining a plurality of frequency values corresponding to a plurality of pixels in the
microscopic image of the tissue 102
```

```
grouping the plurality of pixels into a plurality of pixel clusters based on the plurality
of frequency values corresponding to the plurality of pixels 104
```

```
identifying, from the plurality of pixel clusters, one or more pixel clusters
corresponding to one or more artifacts in the microscopic image and filtering the
microscopic image by removing one or more regions in the microscopic image
corresponding to the one or more pixel clusters corresponding to the one or more
artifacts 106
```

```
further filtering the microscopic image by removing a region in the microscopic image
corresponding to a pixel cluster below a predefined frequency threshold 108
```

```
filling one or more holes in the filtered microscopic image 110
```

```
inputting the filtered microscopic image or a representation of the filtered microscopic
image into a trained machine learning model 112
```

FIG. 1

SYSTEMS AND METHODS FOR ARTIFACT DETECTION AND REMOVAL FROM IMAGE DATA

CROSS REFERENCE TO RELATED APPLICATIONS

This application is a continuation application of International Application No. PCT/US2024/054929, filed internationally on Nov. 7, 2024, which claims the priority benefit of U.S. Provisional Patent Application Ser. No. 63/548,141, filed Nov. 10, 2023, the disclosures of which are herein incorporated by reference in their entirety.

FIELD

This disclosure relates generally to image processing and more specifically to techniques for removing artifacts from images.

BACKGROUND

Digital pathology can encompass the acquisition, management, and interpretation of digitized histology images. With increasing frequency, whole slide histology images (WSIs) are collected and stored as part of routine clinical care. These images are complex and varied due to their relatively large size (e.g., gigapixel), heterogeneity across tissues and disease states, and the encoding of information across multiple channels and spatial scales. Machine learning has the potential to uncover patterns in WSIs that would be difficult for even expert pathologists to discern. Such models have numerous potential applications, including automated disease detection and pathological feature quantification, computer aided diagnosis, disease prognosis prediction, and personalized treatment planning.

Digital pathology has been enabled by the advent of whole slide imaging technologies that can scan entire microscopy slides into high-resolution digital images. However, the acquisition of WSIs is not without challenges. Artifacts (i.e., unwanted alterations in the image that are not present in the original specimen) are a common issue in WSIs. These defects can arise throughout the tissue processing, staining, and digitization process. Examples include creases in the tissue, bubbles or dust particles, out-of-focus regions, cover slip edges (i.e., cover slip), and overlying pen markings. The presence of artifacts poses a significant challenge to the algorithmic processing and analysis of WSIs, and misinterpretation of the underlying pathological features due to artifacts could adversely affect patient outcomes. Therefore, the development of effective artifact removal techniques is of paramount importance in digital pathology.

However, the variability of both tissues and artifacts, and of sample preparation and imaging conditions, makes it challenging to reliably detect artifacts using traditional image processing techniques. There are several existing tools for quality control (QC) of digital pathology images. For instance, Senaras et al., developed DeepFocus, a deep convolutional neural network (CNN) for identifying out-of-focus and blurry regions in WSIs. See Calgar Senaras et al., *DeepFocus: Detection of out-of-focus regions in whole slide digital images using deep learning*, 13(10) PLOS ONE (2018) doi:10.1371/journal.pone.0205387. Janowczyk et al [7] developed HistoQC, a collection of tools for digital pathology QC, including a supervised classifier for identifying pen markings. See Andrew Janowczyk et al., *His-toQC: An Open-Source Quality Control Tool for Digital Pathology Slides*, 3 JCO Clinical Cancer Informatics 1-7 (2019) https://doi.org/10.1200/CCI.18.00157. Berman et al., developed SliDL, a toolbox for pre- and post-processing WSIs that includes the Deep Tissue Detector, a CNN that performs semantic segmentation of image tiles into artifact, background, and tissue. Adam G. Berman, et al., *SliDL: A toolbox for processing whole-slide images in deep learning*, 18(8) PLOS ONE (2023) https://doi.org/10.1371/journal.pone.0289499. Similarly, Patil et al., developed HistoROI, a deep CNN for performing 6-way tile-level classification, including into an artifact category. Abhijeet Patil et al., *Efficient quality control of whole slide pathology images with human-in-the-loop training*, 14 J. Pathology Informatics (2023) https://doi.org/10.1016/j.jpi.2023.100306. The existing approaches often rely on deep learning models, which can be costly to train, typically require a substantial number of labeled examples, and may struggle to transfer across domains, such as different tissue types or preparation protocols, or different types of artifacts. Thus, what is needed is a generalizable, as well as cost-effective and computationally efficient process for removing arbitrary image artifacts.

SUMMARY

Described herein are systems, methods, devices, and non-transitory computer readable storage media, and apparatuses directed to identifying and removing artifacts from image data. An exemplary system may be configured to convert images into frequency values and filter the image(s) to remove one or more regions corresponding to artifacts based on the frequency values. More specifically, according to some embodiments, an exemplary system determines a plurality of frequency values corresponding to a plurality of pixels in a microscopic image of a tissue. The system may group spatially proximal pixels having similar frequency values (e.g., within a predefined threshold of one another) into pixel clusters. Pixel clusters corresponding to artifacts may generally have different (e.g., lower) frequency values than pixel clusters corresponding to tissue unaffected by an artifact. Accordingly, the system may identify artifacts from the image based on the frequency values associated with pixel clusters. The system may then filter those pixel clusters from the image to remove the artifact(s). The filtered image may then be used by the system for various downstream tasks, such as predictive analysis, by inputting the filtered image into various machine learning models.

The systems and methods described herein provide numerous technical advantages over existing systems for artifact removal from image data. Unlike the existing systems described above, the systems and methods described herein rely on observable and highly generalizable frequency differences between patient tissue and image artifacts rather than on costly and artifact class specific deep learning models, and thus do not require expensive-to-produce labeled training data. Training machine learning models can also be computationally expensive. The systems and methods described herein do not require training, and, during runtime, the pixel clustering and filtering performed by systems and methods described herein may not require as much processing power or memory as existing deep learning methods for artifact removal. Moreover, the systems and methods described herein are transferable across domains, such as different tissues types or preparation protocols, and different types of artifacts, including ones not previously seen, because WSI pixels can be converted into frequency values regardless of the tissue type depicted or preparation protocol implemented. Further, by identifying artifacts based on differences in frequency compared to tissue, the systems and methods described herein are applicable to removal of any type of macro-scale artifact (e.g., artifacts that are of any shape and/or origin that are larger in size than the largest individual cell(s) contained in a WTS of a WSI).

The systems and methods described herein may also improve the functioning of a computer system. For instance, because the artifact removal process can be based on clustering of frequency values (e.g., rather than analyzing amplitude values by, for example, computer vision techniques), the resolution of the image can be down-sampled, and the images can be converted to gray scale without degrading performance, reducing the computational power required to perform artifact removal.

In some aspects, provided herein is a method for filtering out artifacts from a microscopic image of a tissue, comprising: determining a plurality of frequency values corresponding to a plurality of pixels in the microscopic image of the tissue; grouping the plurality of pixels into a plurality of pixel clusters based on the plurality of frequency values corresponding to the plurality of pixels; identifying, from the plurality of pixel clusters, one or more pixel clusters corresponding to one or more artifacts in the microscopic image; and filtering the microscopic image by removing one or more regions in the microscopic image corresponding to the one or more pixel clusters corresponding to the one or more artifacts.

In some embodiments, the microscopic image of the tissue comprises any of a whole slide image, a spatial omics image, an immunohistochemistry image, a trichrome image, and a brightfield image of a 2D cell culture.

In some embodiments, the one or more artifacts comprise: a tissue fold, a pen marking, an air bubble, defocus, or any combination thereof.

In some embodiments, the microscopic image of the tissue is obtained by: reducing a resolution of an original microscopic image of the tissue; and converting the original microscopic image of the tissue with the reduced resolution into grayscale.

In some embodiments, determining the plurality of frequency values corresponding to the plurality of pixels in the microscopic image of the tissue comprises computing the Laplacian of the microscopic image of the tissue.

In some embodiments, the method further comprises reducing noise in the plurality of frequency values corresponding to the plurality of pixels in the microscopic image.

In some embodiments, reducing noise in the plurality of frequency values corresponding to the plurality of pixels in the microscopic image comprises performing a Gaussian smoothing algorithm on the plurality of frequency values corresponding to the plurality of pixels in the microscopic image.

In some embodiments, one or more parameters of the Gaussian smoothing algorithm are determined based on a resolution of the microscopic image of the tissue, one or more cellular structures in the microscopic image of the tissue, or any combination thereof.

In some embodiments, grouping the plurality of pixels into the plurality of pixel clusters comprises identifying a plurality of initial pixel clusters via a K-means algorithm.

In some embodiments, the method further comprises assigning all pixels in each initial pixel cluster of the plurality of initial pixel clusters to a representative frequency value of the respective initial pixel cluster.

In some embodiments, the representative frequency value of the respective initial pixel cluster comprises a centroid of the respective initial pixel cluster.

In some embodiments, the method further comprises merging one or more initial pixel clusters of the plurality of initial pixel clusters via a Region Adjacency Graph (RAG).

In some embodiments, wherein identifying the one or more pixel clusters corresponding to the one or more artifacts in the microscopic image comprises: identifying a foreground portion and a background portion of the microscopic image, wherein the one or more artifacts are located in the background portion of the microscopic image.

In some embodiments, the foreground portion and the background portion of the microscopic image are identified via a binary thresholding algorithm.

In some embodiments, the method further comprises further filtering the microscopic image by removing a region in the microscopic image corresponding to a pixel cluster below a predefined frequency threshold.

In some embodiments, the method further comprises filling one or more holes in the filtered microscopic image.

In some embodiments, the method further comprises inputting the filtered microscopic image or a representation of the filtered microscopic image into a trained machine learning model.

In some embodiments, the trained machine learning model is configured to provide an output indicative of a diagnosis, a treatment, an association between phenotypes, an outcome prediction, a subtype classification, an imputed value, or any combination thereof.

In some aspects, provided herein is a system for filtering out artifacts from a microscopic image of a tissue, the system comprising one or more processors, memory, and one or more programs stored in the memory for execution by the one or more processors, the one or more programs including instructions that when executed by the one or more processors cause the system to: determine a plurality of frequency values corresponding to a plurality of pixels in the microscopic image of the tissue; group the plurality of pixels into a plurality of pixel clusters based on the plurality of frequency values corresponding to the plurality of pixels; identify, from the plurality of pixel clusters, one or more pixel clusters corresponding to one or more artifacts in the microscopic image; and filter the microscopic image by removing one or more regions in the microscopic image corresponding to the one or more pixel clusters corresponding to the one or more artifacts.

In some aspects, provided herein is a non-transitory computer-readable medium storing instructions for filtering out artifacts from a microscopic image of a tissue, wherein the instructions are executable by a system comprising one or more processors to cause the system to: determine a plurality of frequency values corresponding to a plurality of pixels in the microscopic image of the tissue; group the plurality of pixels into a plurality of pixel clusters based on the plurality of frequency values corresponding to the plurality of pixels; identify, from the plurality of pixel clusters, one or more pixel clusters corresponding to one or more artifacts in the microscopic image; and filter the microscopic image by removing one or more regions in the microscopic image corresponding to the one or more pixel clusters corresponding to the one or more artifacts.

BRIEF DESCRIPTION OF THE FIGURES

Various aspects of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 1 illustrates an exemplary method for filtering out artifacts from a microscopic image of a tissue according to some embodiments.

DETAILED DESCRIPTION

Figure 2:
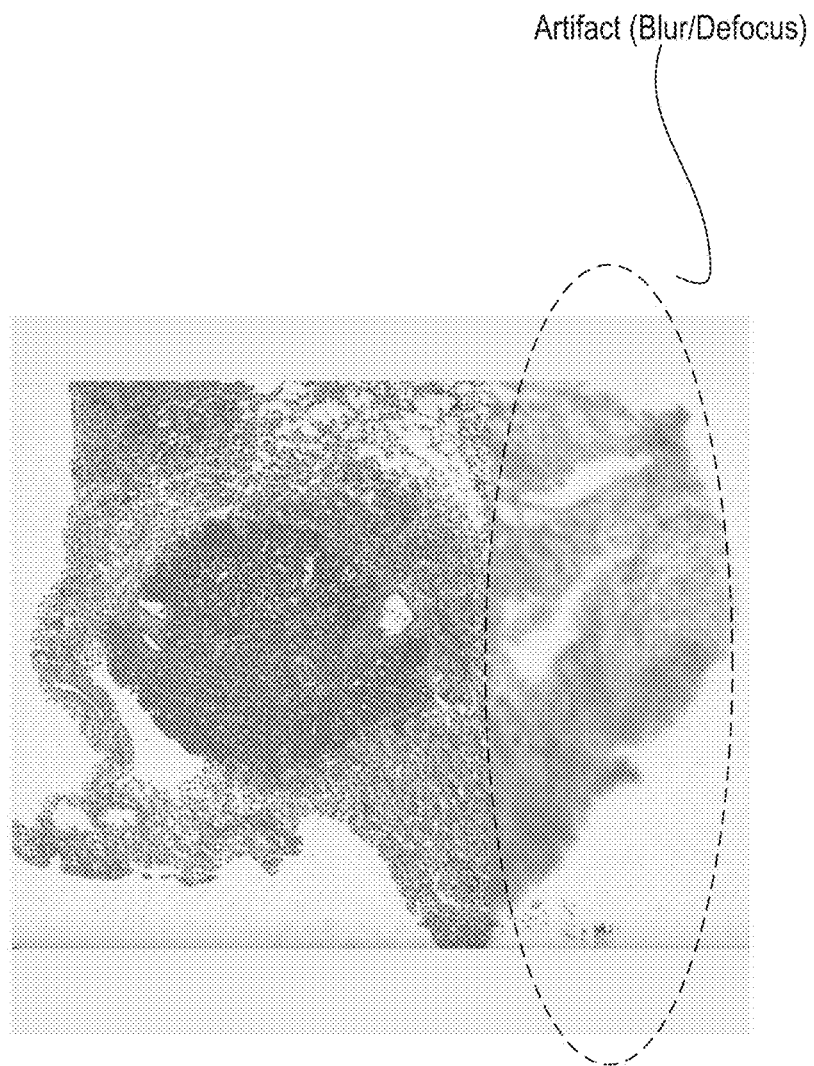
FIG. 2 illustrates an exemplary microscopic image of a tissue that includes an out-of-focus region or blur artifact according to some embodiments.

Described herein are systems, methods, devices, and non-transitory computer readable storage media, and apparatuses directed to identifying and removing artifacts from image data. An exemplary system may convert images of tissue samples into frequency values and apply one or more filters to the image to remove one or more regions corresponding to artifacts based on the frequency values.

Specifically, according to some embodiments, an exemplary system may determine a plurality of frequency values that correspond to pixels in a microscopic image of a tissue sample. The system may determine a frequency value for each pixel of an image by computing the Laplacian of the image. Regions having relatively higher frequency values within the image may correspond to biological tissue, whereas regions having relatively lower frequency values may correspond to artifacts. This difference in frequency corresponds to intuitive distinctions between the artifacts and biological tissue. Specifically, there is a relatively higher degree of change from pixel to pixel in image regions depicting biological tissue compared to the degree of change from pixel to pixel in image regions depicting artifacts. Tissue morphologies may vary significantly across pixels at the cellular level. In contrast, regions depicting artifacts may change relatively little. A pixel depicting an ink marking (e.g., from a physician's pen) may appear approximately the same in one pixel compared to the adjacent pixel. Accordingly, the frequency values provide a strong approximation of and/or proxy for artifacts in microscopic tissue images.

In some embodiments, prior to determining the frequency values, the system may apply one or more preprocessing techniques to the image. For example, the system may down-sample the image (e.g., reduce the resolution of the image) and/or convert the image to gray scale. These preprocessing techniques can reduce computational requirements, processing load, etc. without degrading the performance of the artifact identification and removal process. In some embodiments, the system may further apply one or more post-processing techniques such as noise reduction. For example, the system may apply a Gaussian smoothing technique, which may be configured to maintain the visibility of target artifacts (defocus, pen markings, dust, cover slip edges, etc.), which span beyond the cellular level, allowing for their subsequent identification and handling in the image analysis process, while omitting finer details such as subcellular structures, etc. which may be irrelevant to the artifact removal process.

After converting the image to a plurality of frequency values and applying any pertinent pre-and-post-processing techniques, the system may group the plurality of pixels into a plurality of pixel clusters based on the plurality of frequency values corresponding to the plurality of pixels. To do so, the system may apply a spatial clustering and collapsing algorithm, such as a K-means algorithm or Simple Linear Iterative Clustering (SLIC) algorithm. The system may then combine spatially proximal pixel clusters assigned similar frequency values. The grouping of pixels into pixel clusters and subsequent grouping of the pixel clusters is based on a principle that a relatively lower frequency pixel (e.g., compared to higher frequency pixels/clusters of pixels associated with tissue) or group/cluster of pixels is more likely to be an artifact if it is located adjacent to or near another relatively low frequency pixel or pixel cluster associated with an artifact. Accordingly the removal of artifacts can be simplified by filtering pixel clusters or groups of pixel clusters having similar frequency values from the image, as opposed to filtering the image pixel by pixel.

After grouping the pixels into pixel clusters based on frequency values and optionally combining pixel clusters, the system may identify, from the plurality of pixel clusters, one or more pixel clusters corresponding to one or more artifacts in the microscopic image. The system may filter the microscopic image by removing one or more regions in the microscopic image corresponding to the one or more pixel clusters associated with an artifact. In some embodiments, identification of pixel clusters corresponding to artifacts and filtering of those pixel clusters from the image includes dividing the image into a foreground and a background, in which the artifacts are part of the background of the image. This step may be performed using a binary thresholding method such as the binary Otsu thresholding method.

In some embodiments, the system may further filter the microscopic image using a low frequency filter to remove region(s) in the microscopic image corresponding to pixel cluster(s) that fall below a predefined frequency threshold. This may be particularly useful when the original WSIs are very blurry (and there is no high-quality tissue to select via Otsu's method). In some embodiments, only regions that are both included in the foreground and that surpass the low frequency threshold are retained in the image.

In some embodiments, to make the algorithm robust to tissue types that contain regions that appear artifactual (i.e., like contiguous relatively low-frequency areas) but actually should be included in the final filtered image (such as lipid droplets, or frozen tissue with cytoplasmic retraction), the system fills one or more holes in the filtered image that are smaller than a predefined threshold size. The threshold may be determined based on the known approximate sizes of cellular structures. Finally, the system may input the filtered microscopic image, or a representation of the filtered microscopic image, into a trained machine learning model to generate various predictions (e.g., disease diagnoses, treatment recommendations, disease progression modeling, etc.) based on the filtered image. In some embodiments, the filtered image may be used to train a machine learning model. For instance, a training data set of a plurality of filtered images (e.g., filtered according to the process set forth herein), may be generated and used to train one or more machine learning models. By removing artifacts from the images, the training dataset may more accurately depict target characteristics that a model is being trained to predict. Accordingly, training a machine learning model using the filtered images may result in a more efficient training process and/or a better performing machine learning model compared to a model trained on unfiltered image data (e.g., image data containing relatively more artifacts than the filtered images described herein).

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The structure for a variety of these systems will appear from the description below. In addition, the present invention is not described with reference to any particular programming language. It will be appreciated that a variety of programming languages may be used to implement the teachings of the present disclosure as described herein.

FIG. 1 illustrates an exemplary process 100 for filtering out artifacts from a microscopic image of a tissue, according to some embodiments. Process 100 is performed, for example, using one or more electronic devices implementing a software platform. In some examples, process 100 is performed using one or more electronic devices. In some embodiments, process 100 is performed using a client-server system, and the blocks of process 100 are divided up in any manner between the server and one or more client devices. Thus, while portions of process 100 are described herein as being performed by particular devices, it will be appreciated that process 100 is not so limited. In process 100, some blocks are, optionally, combined, the order of some blocks is, optionally, changed, and some blocks are, optionally, omitted. In some examples, additional steps may be performed in combination with the process 100. Accordingly, the operations as illustrated (and described in greater detail below) are exemplary by nature and, as such, should not be viewed as limiting. The process 100 may be applied to a variety of different medical image modalities. For instance, the microscopic image of the tissue may include a whole slide image, a spatial omics image, and/or a brightfield image of a 2D cell culture.

At block 102, an exemplary system (e.g., one or more electronic devices) determines a plurality of frequency values corresponding to a plurality of pixels in the microscopic image of the tissue. Determining the plurality of frequency values corresponding to the plurality of pixels in the microscopic image of the tissue may include computing the Laplacian of the microscopic image of the tissue. However, it should be understood that a variety of image filters could be used to determine the frequency values. For instance, the system may use a Gaussian filter, canny filter, box filter, Tenengrad filter, variance of Laplacian filter, Sobel filter, the slope of the log-log plot of the radial power spectrum of the image, etc. The width and shape of the filter may influence the signal detected. The plurality of frequency values corresponding to the plurality of pixels in the microscopic image of the tissue may distinguish regions of the image that depict tissue content from artifacts such as ink marks on the image (e.g., from a physician noting areas of interest with a pen, marker, etc.), folded regions of the tissue, blurred portions (e.g., out of focus regions), and so on. The cellular detail included in regions of the image that depict tissue (as opposed to an artifact) are generally higher frequency than regions impacted by artifacts. This may be because biological features of tissue samples change more from pixel to pixel compared to regions of the image depicting artifacts. For example, pen ink tends to be larger and more uniform, and may therefore correspond to a relatively lower frequency region of an image. Thus, artifacts may be represented by defocused (e.g., relatively lower frequency) regions of the image, and tissue may be represented by relatively higher frequency regions. In other words, the systems and methods herein may operate based on a principle that artifacts include different information content than tissue, regardless of whether the artifact is an out-of-focus region, a frozen tissue region, a folded tissue region, a WSI cover slip (i.e., cover slip edges), an ink marking, a hairs, cracks, dust particles, etc. Accordingly, at block 102, the system represents an image as a plurality of frequency values in which lower frequency regions may correspond to artifacts, agnostic of the type of artifact, and higher frequency regions may correspond to tissue. The input at block 102 may be a two-dimensional array of numbers that make up the image and the output may also be a two-dimensional array of numbers representing how quickly the pixels are changing in various regions of the image.

The system may further reduce noise in the plurality of frequency values corresponding to the plurality of pixels in the microscopic image. Reducing noise in the plurality of frequency values may include performing a smoothing algorithm, for instance, a Gaussian smoothing algorithm, on the plurality of frequency values corresponding to the plurality of pixels in the microscopic image. One or more parameters of the Gaussian smoothing algorithm may be determined based on a resolution of the microscopic image of the tissue, one or more cellular structures in the microscopic image of the tissue, or any combination thereof. In some embodiments, the scale factor of the Gaussian smoothing algorithm may be selected to align with the typical size of subcellular structures in histopathology images and may vary inversely with the working resolutions such that higher-resolution images are smoothed to a greater extent. The Gaussian smoothing may obscure subcellular detail but maintain the visibility of the target macroscale artifacts, which span beyond the cellular level. In other words, the scale factor may be selected based on the smallest structures in the image that should remain visible (e.g., cells or cellular structures). A cell or a fat globule may not be over, for instance, approximately 20 or 30 or 50 microns, whereas artifacts like ink may be significantly larger. It should be understood that Gaussian smoothing is only used as an exemplary smoothing method. Various other methods are within the scope of this disclosure, for instance, a moving average smoothing algorithm.

In some embodiments, the scale factor $\sigma$ is set to between 4 and 16 MPP divided by the working resolution. In some embodiments, the scale factor $\sigma$ is set to at least 1 MPP divided by the working resolution, at least 2 MPP divided by the working resolution, at least 3 MPP divided by the working resolution, at least 4 MPP divided by the working resolution, at least 5 MPP divided by the working resolution, at least 6 MPP divided by the working resolution, at least 7 MPP divided by the working resolution, at least 8 MPP divided by the working resolution, at least 9 MPP divided by the working resolution, at least 10 MPP divided by the working resolution, at least 11 MPP divided by the working resolution, at least 12 MPP divided by the working resolution, at least 13 MPP divided by the working resolution, at least 14 MPP divided by the working resolution, at least 15 MPP divided by the working resolution, at least 16 MPP divided by the working resolution, at least 17 MPP divided by the working resolution, at least 18 MPP divided by the working resolution, at least 19 MPP divided by the working resolution, and/or at least 20 MPP divided by the working resolution. In some embodiments, the scale factor is set to no more than 20 MPP divided by the working resolution, no more than 19 MPP divided by the working resolution, no more than 18 MPP divided by the working resolution, no more than 17 MPP divided by the working resolution, no more than 16 MPP divided by the working resolution, no more than 15 MPP divided by the working resolution, no more than 14 MPP divided by the working resolution, no more than 13 MPP divided by the working resolution, no more than 12 MPP divided by the working resolution, no more than 11 MPP divided by the working resolution, no more than 10 MPP divided by the working resolution, no more than 9 MPP divided by the working resolution, no more than 8 MPP divided by the working resolution, no more than 7 MPP divided by the working resolution, no more than 6 MPP divided by the working resolution, no more than 5 MPP divided by the working resolution, no more than 4 MPP divided by the working resolution, no more than 3 MPP divided by the working resolution, no more than 2 MPP divided by the working resolution, and/or no more than 1 MPP divided by the working resolution.

In some embodiments, the microscopic image of the tissue may be obtained by reducing the resolution of an original microscopic image of the tissue. For instance, the original microscopic image of the tissue may be a whole slide image (WSI). WSIs may contain billions of pixels, making computation over the full-resolution image expensive. Down-sampling (e.g., reducing the WSI resolution) may greatly accelerate the computation without degrading performance. The image may be down-sampled to a working resolution of the size of subcellular structures (e.g., the nucleus). For example, the image may be down-sampled to between 1 and 20 μm per pixel (MPP), between 1 and 10 MPP, and/or between 6 and 10 MPP. In some embodiments, the image may be down-sampled to at least 1 MPP, at least 2 MPP, at least 3 MPP, at least 4 MPP, at least 5 MPP, at least 6 MPP, at least 7 MPP, at least 8 MPP, at least 9 MPP, at least 10 MPP, at least 11 MPP, at least 12 MPP, at least 13 MPP, at least 14 MPP, at least 15 MPP, at least 16 MPP, at least 17 MPP, at least 18 MPP, at least 19 MPP, at least 20 MPP. The image may be down-sampled to no more than 1 MPP, no more than 2 MPP, no more than 3 MPP, no more than 4 MPP, no more than 5 MPP, no more than 6 MPP, no more than 7 MPP, no more than 8 MPP, no more than 9 MPP, no more than 10 MPP, no more than 11 MPP, no more than 12 MPP, no more than 13 MPP, no more than 14 MPP, no more than 15 MPP, no more than 16 MPP, no more than 17 MPP, no more than 18 MPP, no more than 19 MPP, no more than 20 MPP.

In some embodiments, the microscopic image of the tissue may be obtained by converting the original microscopic image of the tissue (with or without the reduced resolution) into greyscale. For example, hematoxylin and eosin (H&E) stained images are typically acquired with 3 color channels (RGB). To simplify subsequent processing, the original color image(s) may be converted to grayscale. The system may convert the original microscopic image of the tissue (with or without the reduced resolution) into grayscale using any method for conversion of a color image to grayscale (e.g., the average method, luminosity method, etc.).

At block 104, the system may group the plurality of pixels into a plurality of pixel clusters based on the plurality of frequency values corresponding to the plurality of pixels. Grouping the plurality of pixels into the plurality of pixel clusters may include identifying a plurality of initial pixel clusters via spatial clustering and collapsing (e.g., via a K-means algorithm, mean shift clustering, superpixel segmentation, quadtree decomposition, region growing, etc.). Each pixel cluster may include a plurality of pixels with similar frequency values (e.g., as determined at block 102). In other words, the system may over-segment a smoothed Laplacian texture map obtained at block 102 into pixel clusters of pixels that have relatively similar frequency values (e.g., each cluster may be formed using a clustering algorithm that minimizes the variance of frequency values of pixels within the pixel cluster). and/or that are spatially proximal to one another within the image. For example, pixels from a region of an image covered by a pen ink marking (i.e., an artifact) may have similar frequency values because there may be relatively little change from pixel to pixel in a region covered by an ink marking compared to a region depicting cells of a tissue sample. The pixels in such a region covered by the pen marking may be grouped together into a pixel cluster. The system may further assign all pixels in each initial pixel cluster of the plurality of initial pixel clusters to a representative frequency value of the respective initial pixel cluster. The representative frequency value of the respective initial pixel cluster may include a centroid of the respective initial pixel cluster. In some embodiments, the representative value may be a mean or median frequency value of the pixels grouped into the respective pixel cluster.

In some embodiments, the system merges one or more initial pixel clusters of the plurality of initial pixel clusters. The system may merge one or more initial pixel clusters of the plurality of initial pixel clusters using a Region Adjacency Graph (RAG). Each pixel cluster may form a node of the RAG, and edges may link spatially adjacent nodes. Each edge may be weighted by the difference in the representative frequency value of the adjoining nodes. Finally, adjacent pixel clusters with similar representative frequency values may then be combined. A predefined threshold value may be utilized for combining the pixel clusters. The predefined threshold may be any value from 0 to 255 representing the difference in pixel intensity between adjacent pixel clusters (i.e., any two pixel clusters that share an edge). Each pixel cluster's intensity value may be set to that of the centroid of the "cluster" (which may be determined by running K-Nearest Neighbors (KNN) on the Laplacian image) representing the cluster. Adjacent pixel clusters having a difference in pixel intensity below the predefined threshold may be combined. Grouping and merging regions of the image based on frequency characteristics is motivated by the observation that macro-scale low-frequency artifacts, like blur and ink markings, affect entire contiguous regions of the image rather than being finely distributed. The region adjacency graph exploits that the artifacts may co-occur (e.g., pixels associated with artifacts will not be isolated in the image). Accordingly, the systems and methods described herein may more accurately identify artifacts based on a principle that a relatively lower frequency pixel or group/cluster of pixels (e.g., compared to relatively higher pixels/clusters of pixels associated with tissue) is more likely to be an artifact if it is located adjacent to or near another relatively lower frequency pixel or pixel cluster associated with an artifact.

In some embodiments, the system may merge the one or more initial pixel clusters of the plurality of initial pixel clusters using a different method than the RAG. For instance, the system may utilize one or more of the following structural/graphical representations of the spatial arrangement of pixel clusters: a boundary graph, a neighbor joining graph, spatial clustering, Simple Linear Iterative Clustering (SLIC), etc.

At block 106, the system identifies, from the plurality of pixel clusters, one or more pixel clusters corresponding to one or more artifacts in the microscopic image and filters the microscopic image by removing one or more regions in the microscopic image corresponding to the one or more pixel clusters corresponding to the one or more artifacts. Identifying the one or more pixel clusters corresponding to the one or more artifacts in the microscopic image may include identifying a foreground portion and a background portion of the microscopic image. The one or more artifacts may be located in the background portion of the microscopic image. The foreground portion and the background portion of the microscopic image may be identified via a binary thresholding algorithm. In binary thresholding, each pixel in an image may be compared to a threshold value. If a metric associated with the pixel (e.g., frequency) is greater than or equal to the threshold (or strictly greater than), it may be set to a foreground value (e.g., a white color) and if the metric associated with the pixel falls below the threshold, it may be set to a background value (e.g., a black color). In some embodiments, the binary thresholding algorithm is a binary Otsu thresholding algorithm. The Otsu thresholding algorithm may select an optimal threshold (e.g., a threshold that maximizes the separability of the foreground and background) for segmenting the foreground from the background, for instance, as described in Nobuyuki Ostu, *A Threshold Selection Method from Gray-Level Histograms,* 9 IEEE Transactions on Sys., Man, and Cybernetics 62-66 (1979), doi: 10.1109/TSMC.1979.4310076, which is hereby incorporated by reference in its entirety. In some embodiments, Otsu's thresholding method may find an optimal threshold value for the input image by evaluating all possible threshold values. However, a person having skill in the art would understand that there are numerous alternative ways in which the system could be configured to identify one or more pixel clusters corresponding to one or more artifacts in the microscopic image and filter the microscopic image by removing one or more regions in the microscopic image corresponding to the one or more pixel clusters corresponding to the one or more artifacts.

At block 108, the system may further filter the microscopic image by removing a region in the microscopic image corresponding to a pixel cluster below a predefined frequency threshold. Low-frequency artifacts may survive Otsu filtering, particularly when a significant proportion of the image is blurry. To correct for these cases, a low frequency filter may be applied in combination with (e.g., before, after, or in parallel to) Otsu filtering (or other filtering method for separating the foreground and background of the image) that requires the frequency of the region to exceed a predefined threshold. For instance, a threshold may be set to 2% of the maximum frequency scaled by the scale factor $\sigma$ described above with reference to the Gaussian smoothing step at block 102. It should be understood that the aforementioned 2% threshold is meant to be exemplary. The threshold may be set to more than 2% of the maximum frequency scaled by the scale factor $\sigma$ or less than 2% of the maximum frequency scaled by the scale factor $\sigma$. For instance, in some embodiments, the threshold may be set to any of: at least 1% of the maximum frequency scaled by the scale factor $\sigma$, at least 2% of the maximum frequency scaled by the scale factor $\sigma$, at least 3% of the maximum frequency scaled by the scale factor $\sigma$, at least 4% of the maximum frequency scaled by the scale factor $\sigma$, at least 5% of the maximum frequency scaled by the scale factor $\sigma$, at least 6% of the maximum frequency scaled by the scale factor $\sigma$, at least 7% of the maximum frequency scaled by the scale factor $\sigma$, at least 8% of the maximum frequency scaled by the scale factor $\sigma$, at least 9% of the maximum frequency scaled by the scale factor $\sigma$, at least 10% of the maximum frequency scaled by the scale factor $\sigma$, at least 11% of the maximum frequency scaled by the scale factor $\sigma$, at least 12% of the maximum frequency scaled by the scale factor $\sigma$, at least 13% of the maximum frequency scaled by the scale factor σ, at least 14% of the maximum frequency scaled by the scale factor σ, and/or at least 15% of the maximum frequency scaled by the scale factor σ. In some embodiments, threshold may be set to no more than 15% of the maximum frequency scaled by the scale factor σ, no more than 14% of the maximum frequency scaled by the scale factor σ, no more than 13% of the maximum frequency scaled by the scale factor σ, no more than 12% of the maximum frequency scaled by the scale factor σ, no more than 11% of the maximum frequency scaled by the scale factor σ, no more than 10% of the maximum frequency scaled by the scale factor σ, no more than 9% of the maximum frequency scaled by the scale factor σ, no more than 8% of the maximum frequency scaled by the scale factor σ, no more than 7% of the maximum frequency scaled by the scale factor σ, no more than 6% of the maximum frequency scaled by the scale factor σ, no more than 5% of the maximum frequency scaled by the scale factor σ, no more than 4% of the maximum frequency scaled by the scale factor σ, no more than 3% of the maximum frequency scaled by the scale factor σ, no more than 2% of the maximum frequency scaled by the scale factor σ, no more than 1% of the maximum frequency scaled by the scale factor σ, In some embodiments, only regions that are both included in the foreground and that surpass the low frequency threshold are retained in the image.

At block 110, the system may fill one or more holes in the filtered microscopic image. Certain tissue types may contain low-frequency regions that are not artifactual. Examples include lipid droplets, vessel lumens, and spaces where the cytoplasm has retracted during freezing. To prevent the systems and methods described herein from filtering out these structures, which can include meaningful information for downstream analyses, holes in the foreground mask smaller than a predefined threshold may be in-filled. In some embodiments, the predefined threshold may a maximum hole size of any of 1000 μm, 900 μm, 800 μm, 700 μm, 600 μm, 500 μm, 400 μm, 300 μm, 200 μm, 100 μm, 90 μm, 80 μm, 70 μm, 60 μm, 50 μm, 40 μm, 30 μm, 20 μm, 10 μm, or any value therebetween. In some embodiments, the predefined threshold may be greater than 1000 μm. In some embodiments, the predefined threshold may be less than 10 μm.

At block 112, the system may input the filtered microscopic image or a representation of the filtered microscopic image into a trained machine learning model. The trained machine learning model may be configured to provide an output indicative of a predicted diagnosis, a treatment, an association between phenotypes, an outcome prediction, a subtype classification, an imputed value, a cell state, a disease model, a progression of a disease and/or a measure of disease progression, an impact of a perturbation on a cell, or any combination thereof. Prior to inputting the image or representation into the machine learning model, the filtered image may be pre-processed. For instance, the image may augmented by rotating, scaling, cropping, flipping, etc. (e.g., if the image is being used as training data and a user wishes to diversify the data by introducing noise, etc.), tiled (e.g., divided into small patches), or otherwise manipulated for a specific machine learning task. Representations of the image may include embedding representations (e.g., a higher dimensional vector representation that encodes the image content in a lower dimensional space), for instance, generated using a trained contrastive learning model. The representation may include feature descriptors, vector graphics, or other common image representations input into machine learning models.

Figure 3:
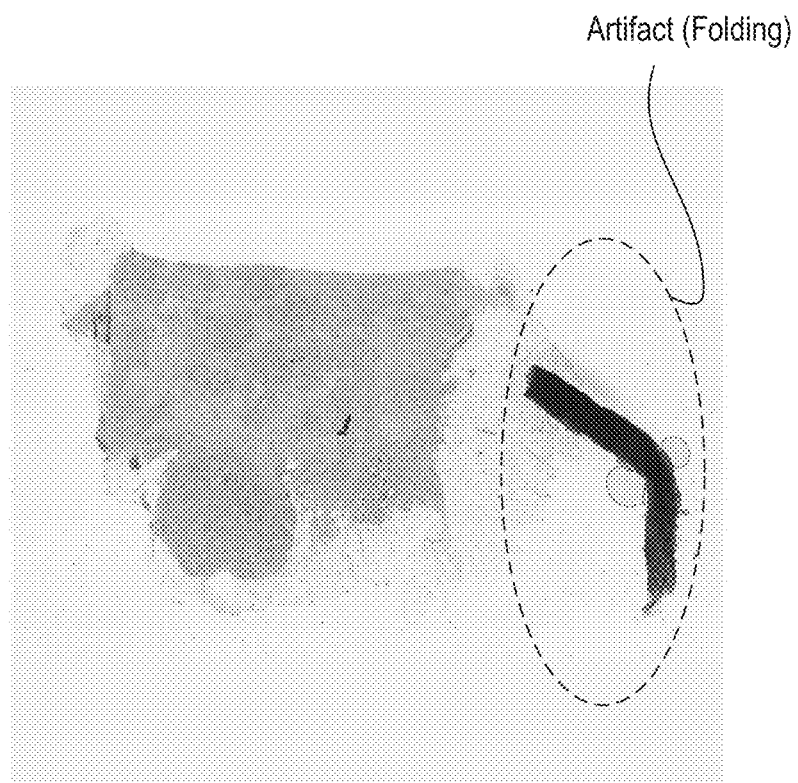
FIG. 3 illustrates an exemplary microscopic image of a tissue that includes a tissue folding artifact according to some embodiments.
Figure 4:
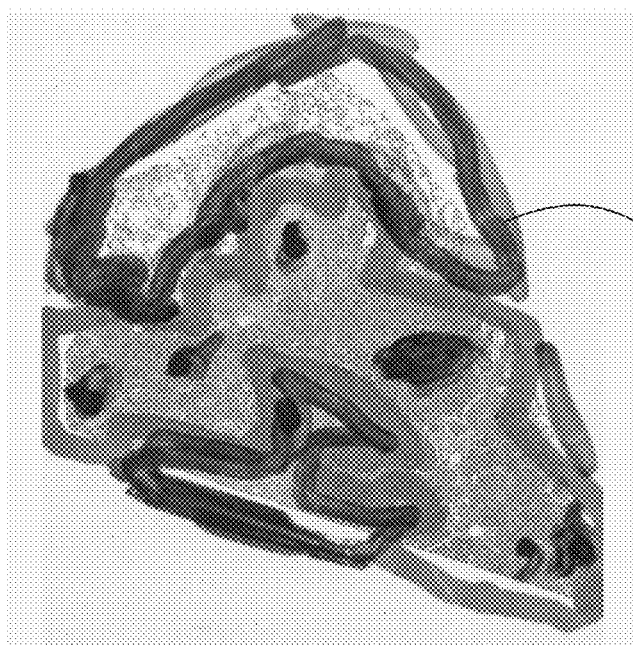
FIG. 4 illustrates an exemplary microscopic image of a tissue that includes an ink artifact according to some embodiments.
Figure 5:
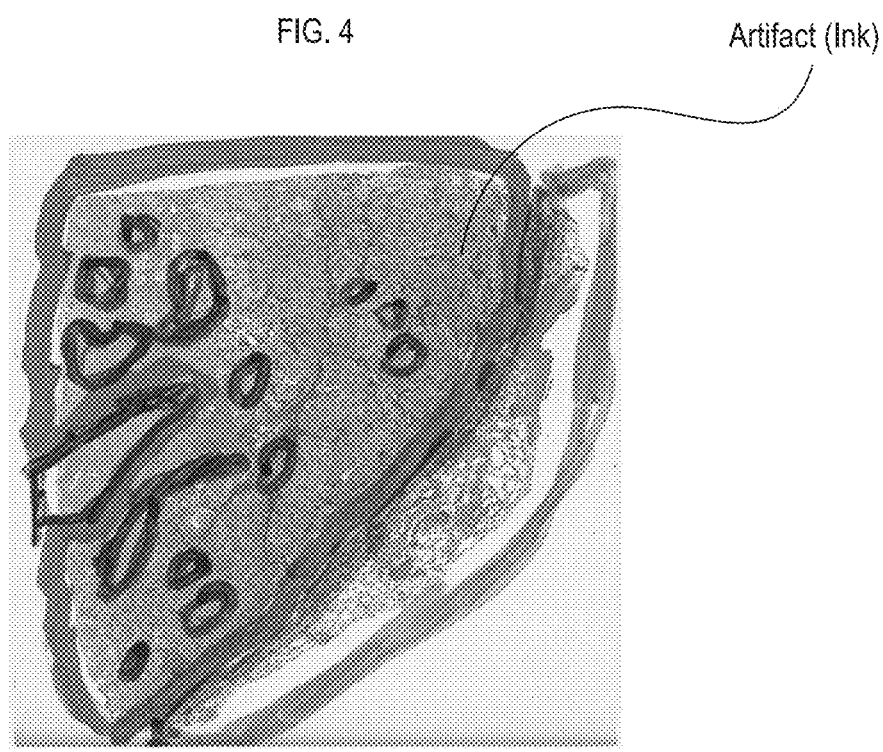
FIG. 5 illustrates an exemplary microscopic image of a tissue that includes an ink artifact according to some embodiments.

As described above, the process 100 described with reference to FIG. 1 is directed to removing artifacts from microscopic images of tissue by converting an image into a plurality of frequency values and filtering out frequency values associated with various artifacts. Artifacts may obscure, block, or otherwise affect an image in a manner that could degrade downstream analysis of the image, for instance, by a machine learning model. Further, artifacts may take on several forms, such as blur (e.g., out-of-focus regions of the tissue), pen markings (e.g., ink), folding (e.g., creases in the tissue), dust particles, etc. FIGS. 2 through 5 illustrate various exemplary artifacts that may be removed using the systems and methods described herein. FIG. 2 illustrates an exemplary microscopic image of a tissue that includes an artifact. The image depicted in FIG. 2 includes a blurred or out-of-focus region on the right hand side of the image. If the microscopic image shown in FIG. 2 were input into a downstream analysis model (e.g., machine learning model) without first identifying and/or removing the artifact, the model may misinterpret the artifact, which could adversely affect patient outcomes, for instance, by predicting an incorrect diagnosis, improper treatment, and so on. FIG. 3 through FIG. 5 similarly illustrate exemplary microscopic images of tissue that include different artifacts. FIG. 3 illustrates an exemplary microscopic image of a tissue with a folding artifact (e.g., the tissue was creased when placed on the slide). FIGS. 4 and 5 illustrate exemplary microscopic images of tissues with ink (e.g., pen markings) overlayed on the images.

Exemplary Application to Removal of Ink Artifact

Figure 6:
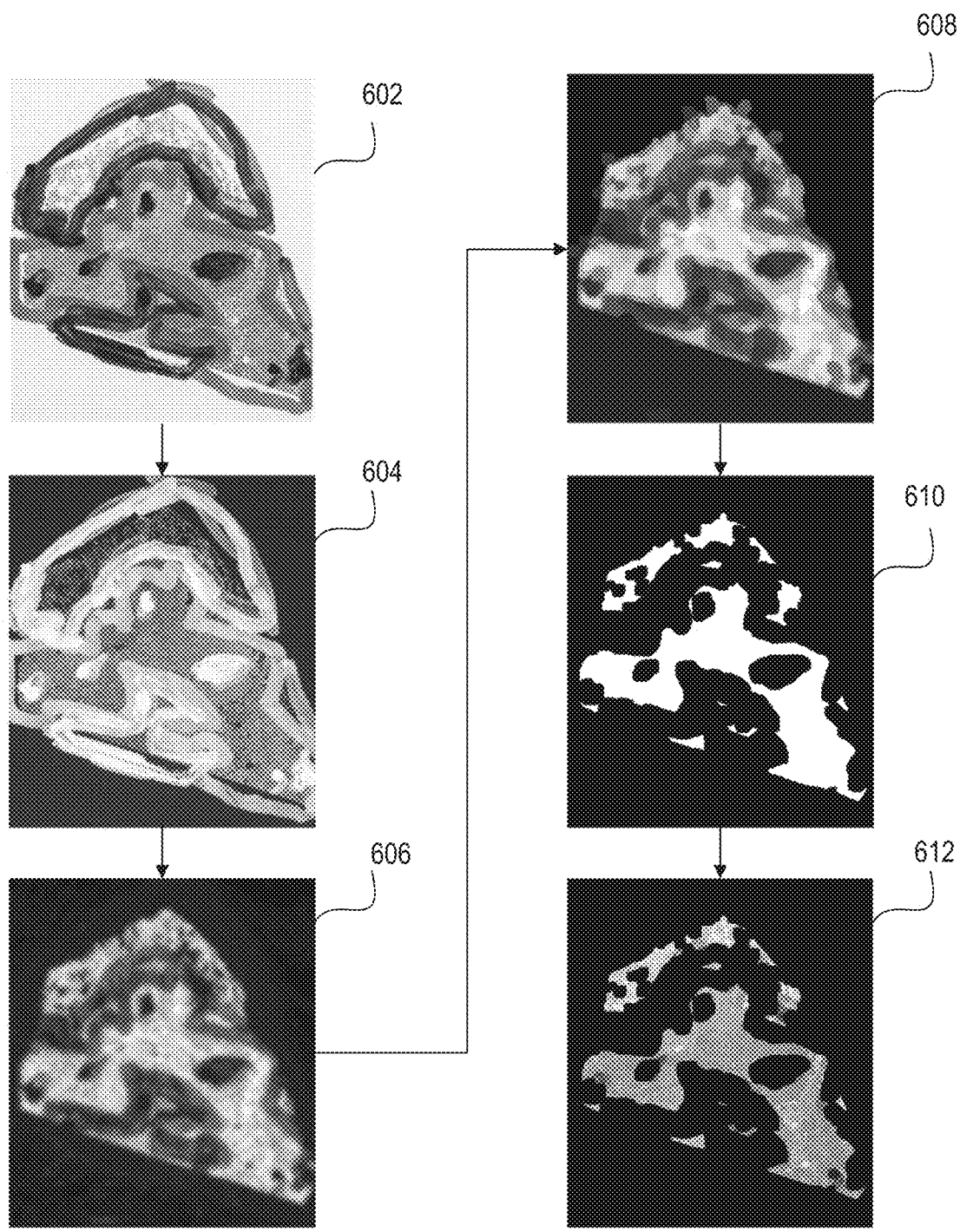
FIG. 6 illustrates a first visualization of the exemplary method for filtering out artifacts from a microscopic image of a tissue according to some embodiments.

FIG. 6 illustrates a visualization of the effects of the systems and methods for filtering out artifacts from a microscopic image of a tissue described herein (e.g., process 100 described above). Image block 602 illustrates an original whole slide image (WSI) of a tissue sample. As shown, the original WSI includes a plurality of artifacts. The artifacts in this example are ink (e.g., pen markings) overlaid on the image. Ink markings are a common artifact on WSIs due to physicians and/or researchers marking up regions of interest on an image of a tissue sample. However, as described throughout, there are numerous types of artifacts (e.g., blurring, folding, etc.) that may be identified and removed from images of tissue samples using the systems and methods described herein. The artifact removal process described herein is generalizable to any type of image artifact based on the recognition that differences in frequency values across regions of the image effectively differentiate regions affected by artifacts from regions clearly depicting tissue.

Image block 604 illustrates an exemplary output produced by the down-sampling (e.g., resolution reduction) and gray scale conversion processes described above with reference to process 100 applied to the original image depicted at block 602. As described above, down-sampling may accelerate the computation (e.g., artifact removal) without degrading performance. In some embodiments, the image may be down-sampled to a working resolution of the size of subcellular structures such as the nucleus. The image depicted in image block 604 was down-sampled to between 6 and 10 MPP, inclusive. In some embodiments, the original image may be down-sampled to a higher or lower resolution (e.g., less than 6 MPP or more than 10 MPP). For instance, in some embodiments, the original image may be down-sampled to 1 MPP, 2 MPP, 3 MPP, 4 MPP, 5 MPP, 6 MPP, 7 MPP, 8 MPP, 9 MPP, 10 MPP, 11 MPP, 12 MPP, 13 MPP, 14 MPP, 15 MPP, 16 MPP, 17 MPP, 18 MPP, 19 MPP, 20 MPP, or any value therebetween. In some embodiments, the original image may be down-sampled to more than 20 MPP or less than 1 MPP. As with down-sampling, gray scale conversion may simplify the artifact removal process without degrading performance.

Image block 606 illustrates an exemplary output image generated based on the image depicted in image block 604 using the frequency determination and noise reduction steps described above with reference to process 100. The exemplary image depicts the output of a Laplacian computation and Gaussian smoothing algorithm applied to the gray scale down-sampled image depicted at image block 604. As illustrated, relatively lower frequency regions of the image appear darker in image block 606 than the relatively higher frequency regions of the image. By comparison to image blocks 602, it is clear that the frequency value representation of the original input image accurately approximates the location of the ink markings shown in the original image. Thus, FIG. 6 demonstrates that relatively lower frequency regions can serve as an effective representation of pen markings on microscopic images of tissue.

Image block 608 illustrates an exemplary output image generated based on the image depicted in image block 606 by grouping pixels into a plurality of pixel clusters and combining spatially proximal (e.g., adjacent) pixel clusters with similar frequency values. The pixel clusters depicted in image block 608 were generated using a K-means algorithm to group pixels with similar frequency values. Pixel clusters were then combined based on a region adjacency graph (RAG), in which each pixel cluster is a node and edges link spatially proximal (e.g., adjacent) nodes. As described above, each edge may be weighted by the difference in centroid frequencies (or other representative frequency) of the adjoining nodes. Adjacent pixel clusters with similar centroid frequencies were then combined (a threshold of 10 (from the intensity values between 0-255 described above) was used to generate the image depicted in image block 608). As noted above, this step, which groups and merges regions of the image by their frequency characteristics is motivated by an observation that macro-scale low-frequency artifacts, like blur and ink markings, may affect entire contiguous regions of the image rather than being finely distributed.

Image block 610 illustrates an image generated based on the image depicted in image block 608 by dividing the image into a foreground and background, filtering low frequency artifacts (e.g., pixels or groups of pixels represented by frequency values falling below a predefined threshold) from the image, and filling holes in the image smaller than a predefined threshold. The image was divided into foreground and background using a binary thresholding algorithm (e.g., Otsu thresholding described above). In parallel to application of the binary thresholding algorithm, a low frequency filter was applied that required the frequency of the region to exceed a small threshold, 2% of the maximum frequency scaled by the scale factor applied during the Laplacian calculation and smoothing step used to generate image block 606 (8 MPP in this example). Only regions included in the foreground by Otsu's method and passing the low frequency threshold are retained in image block 610.

Further, certain tissue types contain low-frequency regions that are not artifactual. Examples include lipid droplets, vessel lumens, and spaces where the cytoplasm has retracted during freezing. To prevent the algorithm from filtering out these structures, which can be meaningful, holes in the foreground mask smaller than a threshold value, for instance, 200 μm are in-filled. In some embodiments, these structures may initially be removed by the low-frequency filter and then added back in during hole filling. It should be understood that the 200 μm threshold described with respect to hole filling is meant to be exemplary. In some embodiments, holes larger than 200 μm may be filled.

Finally, image block 612 illustrates an artifact mask overlayed on the original image depicted in image block 602. The regions shown in black correspond to artifacts identified and removed utilizing the image processing steps described with reference to image blocks 604-610, and the regions shown in color correspond to non-artifact effected regions of tissue in the original image. The masked image may be used for downstream analyses (e.g., by inputting the masked image into one or more trained machine learning models). The trained machine learning model(s) may be trained to provide an output indicative of a predicted diagnosis, a treatment, an association between phenotypes, an outcome prediction, a subtype classification, an imputed value, a cell state, a disease model, a progression of a disease, an impact of a perturbation on a cell, or any combination thereof. For example, a machine learning model may be trained to predict a disease diagnosis and/or predict a recommended treatment associated with the diagnosis.

Exemplary Application to Removal of Blur Artifact

Figure 7:
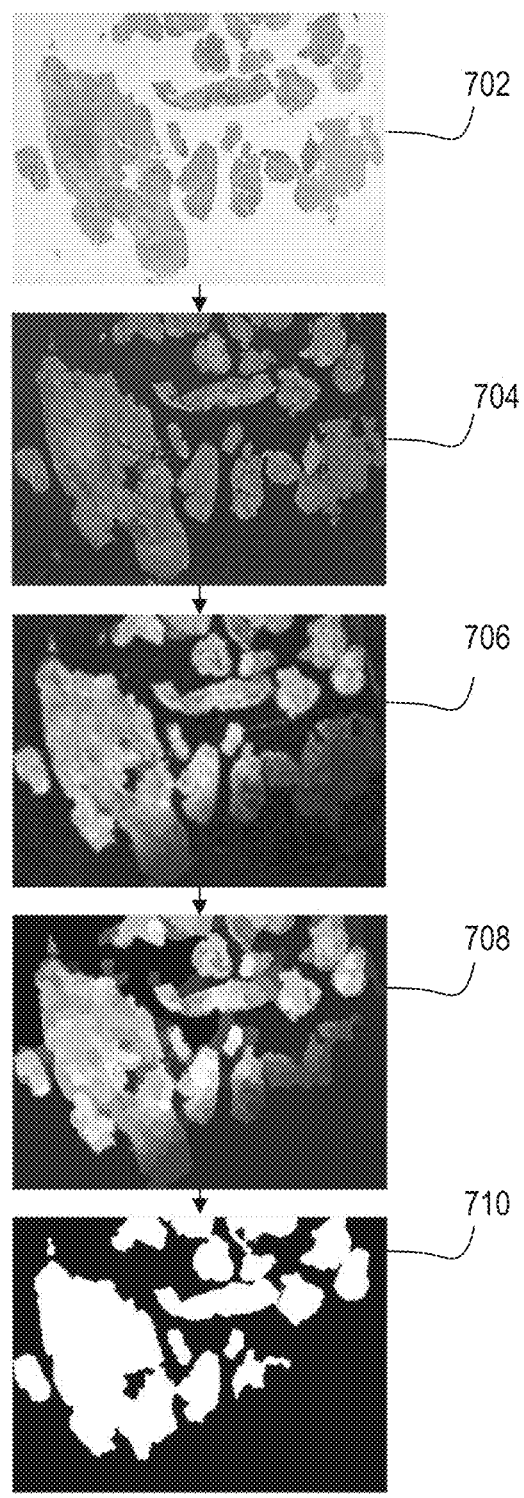
FIG. 7 illustrates a second visualization of the exemplary method for filtering out artifacts from a microscopic image of a tissue according to some embodiments.

FIG. 7 illustrates a visualization, similar to that of FIG. 6, of the effects of the systems and methods for filtering out artifacts from a microscopic image of a tissue described herein (e.g., process 100 described above). Image block 702 illustrates an original WSI of a tissue sample. While the WSI illustrated in image block 602 above clearly depicted ink artifacts overlayed on the WSI, the artifact (an out-of-focus or blurred region of the image) depicted in image block 702 is less visible to the human eye. However, as demonstrated by the results of the artifact removal process shown in image blocks 704-710, the systems and methods described herein remain effective for identifying and removing the blur artifact.

Image block 704 illustrates an exemplary output produced by the down-sampling (e.g., resolution reduction) and gray scale conversion processes described above with reference to process 100, and the visualization of FIG. 6, applied to the original image depicted at block 702. As shown, the down-sampling and gray scale conversion does not render the blur artifact more visible to the naked eye.

Image block 706 illustrates an exemplary output image generated based on the image depicted in image block 704 using the frequency determination and noise reduction steps described throughout. As shown, the lower right corner of the image is darker relative to the upper left corner of the image, representing a relatively low-frequency region of the image corresponding to a blur artifact. Nearly one quarter of the original image was affected by the blur artifact; however, the artifact was nearly undetectable prior to representing the image using a plurality of frequency values. This bolsters the discovery that any artifact (e.g., not merely ink markings, but blur, frozen tissue, folded tissue, slide cover slip, hair, dust particles, cracks, etc.) can generally be represented as different information content (e.g., different entropy than non-artifact obscured tissue), rather than requiring a model specifically configured for each type of artifact.

Image block 708 illustrates an exemplary output image generated based on the image depicted in image block 706 by grouping pixels into a plurality of pixel clusters and combining adjacent pixel clusters with similar frequency values. Image block 708 may be generated substantially as described above with reference to image block 606 of FIG. 6.

Finally, image block 710 illustrates an exemplary output image generated based on the image depicted in image block 708 by dividing the image into a foreground and background, filtering low frequency artifacts (e.g., pixels or groups of pixels represented by frequency values falling below a predefined threshold) from the image, and filling holes in the image smaller than a predefined threshold. The exemplary output image depicted in image block 710 may be generated according to the same steps as described above with reference to image block 610 of FIG. 6. An artifact mask obtained based on the output image depicted in image block 710 may be overlaid on the original image depicted in image block 702, and the masked image may be used for downstream analyses (e.g., by inputting the masked image into one or more trained machine learning models. The trained machine learning model(s) may be trained to provide an output indicative of a predicted diagnosis, a treatment, an association between phenotypes, an outcome prediction, a subtype classification, an imputed value, a cell state, a disease model, a progression of a disease, an impact of a perturbation on a cell, or any combination thereof. For example, a machine learning model may be trained to predict a disease diagnosis and/or predict a recommended treatment associated with the diagnosis. Treatments may be administered to the patient accordingly.

Figure 8:
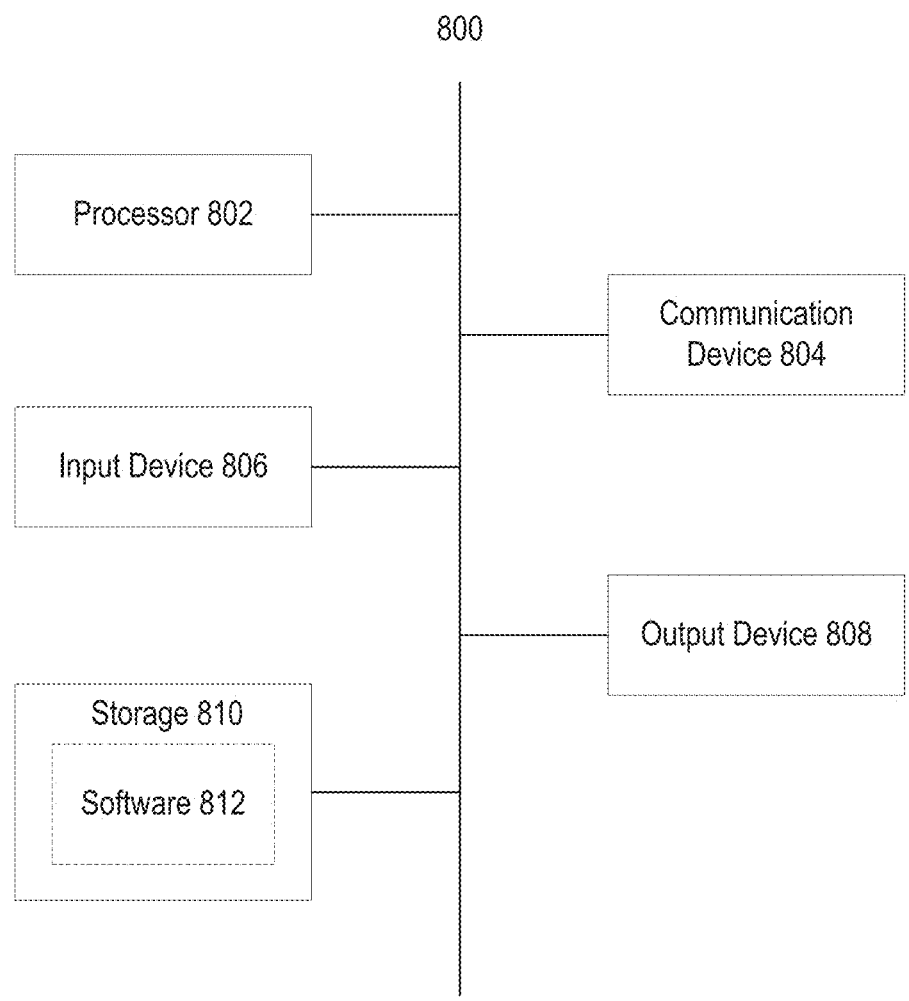
FIG. 8 illustrates an exemplary computing system according to some embodiments.

FIG. 8 depicts an exemplary computing device 800, in accordance with one or more examples of the disclosure. Device 800 can be a host computer connected to a network. Device 800 can be a client computer or a server. As shown in FIG. 8, device 800 can be any suitable type of microprocessor-based device, such as a personal computer, workstation, server, or handheld computing device (portable electronic device) such as a phone or tablet. The device can include, for example, one or more of processors 802, input device 806, output device 808, storage 810, and communication device 804. Input device 806 and output device 808 can generally correspond to those described above and can either be connectable or integrated with the computer.

Input device 806 can be any suitable device that provides input, such as a touch screen, keyboard or keypad, mouse, or voice-recognition device. Output device 808 can be any suitable device that provides output, such as a touch screen, haptics device, or speaker.

Storage 810 can be any suitable device that provides storage, such as an electrical, magnetic, or optical memory, including a RAM, cache, hard drive, or removable storage disk. Communication device 804 can include any suitable device capable of transmitting and receiving signals over a network, such as a network interface chip or device. The components of the computer can be connected in any suitable manner, such as via a physical bus or wirelessly.

Software 812, which can be stored in storage 810 and executed by processor 802, can include, for example, the programming that embodies the functionality of the present disclosure (e.g., as embodied in the devices as described above).

Software 812 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 810, that can contain or store programming for use by or in connection with an instruction execution system, apparatus, or device.

Software 812 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 800 can implement any operating system suitable for operating on the network. Software 812 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

In some embodiments, the systems and methods described herein may implement one or more software packages for carrying out various different functionalities. For instance, scikit-image and/or Scipy may be used to apply one or more of the image filters (Laplacian, Gaussian, etc.), K-means segmentation, and/or RAG construction described herein. NumPy, for example, may be used for a number vector operations, like applying masks to images, type conversion, etc. Pillow, for example, may be used for image visualization tasks, and deep-histopath, for example, may be used for convenient wrappers of functionality provided by the one or more software packages. it should be appreciated by a POSITA that these examples are not limiting and other software applications for carrying out various functionalities of the systems and methods described herein may be used instead and/or in addition to those described above.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A system for filtering out artifacts from a microscopic image of a tissue, the system comprising one or more processors, memory, and one or more programs stored in the memory for execution by the one or more processors, the one or more programs including instructions that when executed by the one or more processors cause the system to:
   determine a plurality of frequency values corresponding to a plurality of pixels in the microscopic image of the tissue;

group the plurality of pixels into a plurality of pixel clusters based on the plurality of frequency values corresponding to the plurality of pixels;

identify, from the plurality of pixel clusters, one or more pixel clusters corresponding to one or more artifacts in the microscopic image; and filter the microscopic image by removing one or more regions in the microscopic image corresponding to the one or more pixel clusters corresponding to the one or more artifacts.

2. The system of claim 1, wherein the microscopic image of the tissue comprises any of a whole slide image, a spatial omics image, an immunohistochemistry image, a trichrome image, and a brightfield image of a 2D cell culture.

3. The system of claim 1, wherein the one or more artifacts comprise: a tissue fold, a pen marking, an air bubble, defocus, or any combination thereof.

4. The system of claim 1, wherein the one or more programs include instructions that when executed by the one or more processors cause the system to obtain the microscopic image of the tissue by:

reducing a resolution of an original microscopic image of the tissue; and converting the original microscopic image of the tissue with the reduced resolution into grayscale.

5. The system of claim 1, wherein determining the plurality of frequency values corresponding to the plurality of pixels in the microscopic image of the tissue comprises computing the Laplacian of the microscopic image of the tissue.

6. The system of claim 5, wherein the one or more programs include instructions that when executed by the one or more processors cause the system to reduce noise in the plurality of frequency values corresponding to the plurality of pixels in the microscopic image.

7. The system of claim 6, wherein reducing noise in the plurality of frequency values corresponding to the plurality of pixels in the microscopic image comprises performing a Gaussian smoothing algorithm on the plurality of frequency values corresponding to the plurality of pixels in the microscopic image.

8. The system of claim 7, wherein one or more parameters of the Gaussian smoothing algorithm are determined based on a resolution of the microscopic image of the tissue, one or more cellular structures in the microscopic image of the tissue, or any combination thereof.

9. The system of claim 1, wherein grouping the plurality of pixels into the plurality of pixel clusters comprises identifying a plurality of initial pixel clusters via a K-means algorithm.

10. The system of claim 9, wherein the one or more programs include instructions that when executed by the one or more processors cause the system to assign all pixels in each initial pixel cluster of the plurality of initial pixel clusters to a representative frequency value of the respective initial pixel cluster.

11. The system of claim 10, wherein the representative frequency value of the respective initial pixel cluster comprises a centroid of the respective initial pixel cluster.

12. The system of claim 11, wherein the one or more programs include instructions that when executed by the one or more processors cause the system to merge one or more initial pixel clusters of the plurality of initial pixel clusters via a Region Adjacency Graph (RAG).

13. The system of claim 1, wherein identifying the one or more pixel clusters corresponding to the one or more artifacts in the microscopic image comprises: identifying a foreground portion and a background portion of the microscopic image, wherein the one or more artifacts are located in the background portion of the microscopic image.

14. The system of claim 13, wherein the foreground portion and the background portion of the microscopic image are identified via a binary thresholding algorithm.

15. The system of claim 1, wherein the one or more programs include instructions that when executed by the one or more processors cause the system to further filter the microscopic image by removing a region in the microscopic image corresponding to a pixel cluster below a predefined frequency threshold.

16. The system of claim 1, wherein the one or more programs include instructions that when executed by the one or more processors cause the system to fill one or more holes in the filtered microscopic image.

17. The system of claim 1, wherein the one or more programs include instructions that when executed by the one or more processors cause the system to input the filtered microscopic image or a representation of the filtered microscopic image into a trained machine learning model.

18. The system of claim 17, wherein the trained machine learning model is configured to provide an output indicative of a diagnosis, a treatment, an association between phenotypes, an outcome prediction, a subtype classification, an imputed value, or any combination thereof.

19. A method for filtering out artifacts from a microscopic image of a tissue, the method comprising:

determine a plurality of frequency values corresponding to a plurality of pixels in the microscopic image of the tissue;

group the plurality of pixels into a plurality of pixel clusters based on the plurality of frequency values corresponding to the plurality of pixels;

identify, from the plurality of pixel clusters, one or more pixel clusters corresponding to one or more artifacts in the microscopic image; and filter the microscopic image by removing one or more regions in the microscopic image corresponding to the one or more pixel clusters corresponding to the one or more artifacts.

20. A non-transitory computer-readable medium storing instructions for filtering out artifacts from a microscopic image of a tissue, wherein the instructions are executable by a system comprising one or more processors to cause the system to:

determine a plurality of frequency values corresponding to a plurality of pixels in the microscopic image of the tissue;

group the plurality of pixels into a plurality of pixel clusters based on the plurality of frequency values corresponding to the plurality of pixels;

identify, from the plurality of pixel clusters, one or more pixel clusters corresponding to one or more artifacts in the microscopic image; and filter the microscopic image by removing one or more regions in the microscopic image corresponding to the one or more pixel clusters corresponding to the one or more artifacts.

* * * * *